US011128893B2

(12) United States Patent
Xue

(10) Patent No.: US 11,128,893 B2
(45) Date of Patent: Sep. 21, 2021

(54) LIVE STREAMING METHOD AND SYSTEM, SERVER, AND STORAGE MEDIUM

(71) Applicant: TENCENT TECHNOLOGY (SHENZHEN) COMPANY LIMITED, Shenzhen (CN)

(72) Inventor: Di Xue, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/256,111

(22) Filed: Jan. 24, 2019

(65) Prior Publication Data

US 2019/0158889 A1 May 23, 2019

Related U.S. Application Data

(63) Continuation of application No. PCT/CN2017/101385, filed on Sep. 12, 2017.

(30) Foreign Application Priority Data

Sep. 18, 2016 (CN) .......................... 201610828121.4

(51) Int. Cl.
| | |
|---|---|
| *G06F 15/16* | (2006.01) |
| *H04N 21/2187* | (2011.01) |
| *H04N 21/234* | (2011.01) |
| *H04N 21/2368* | (2011.01) |
| *H04N 21/4788* | (2011.01) |

(Continued)

(52) U.S. Cl.
CPC ..... *H04N 21/2187* (2013.01); *H04L 65/4092* (2013.01); *H04L 65/602* (2013.01);
(Continued)

(58) Field of Classification Search
CPC .......... H04N 21/2187; H04N 21/2368; H04N 21/8547; H04N 21/4788; H04N 21/234; H04L 65/607; H04L 65/608; H04L 65/80
(Continued)

(56) References Cited

U.S. PATENT DOCUMENTS

| | | | | | |
|---|---|---|---|---|---|
| 5,617,539 A | * | 4/1997 | Ludwig | .................. | H04N 7/147 |
| | | | | | 709/205 |
| 5,862,329 A | * | 1/1999 | Aras | ...................... | H04N 7/152 |
| | | | | | 709/204 |

(Continued)

FOREIGN PATENT DOCUMENTS

| | | |
|---|---|---|
| CN | 101478642 A | 7/2009 |
| CN | 103051864 A | 4/2013 |

(Continued)

OTHER PUBLICATIONS

The State Intellectual Property Office of the People's Republic of China (SIPO) Office Action 1 for 201610828121.4 dated Sep. 4, 2019 11 Pages (including translation).

(Continued)

*Primary Examiner* — Bharat Barot

(74) *Attorney, Agent, or Firm* — Anova Law Group, PLLC

(57) ABSTRACT

Embodiments of the present disclosure disclose a live streaming method and system, a server, and a computer storage medium. The method includes: providing, by a first end for information interaction, a first audio/video live stream for a server, and providing, by a second end for information interaction, a second audio/video live stream for the server. The method further includes performing, by the server, coding and processing on the first audio/video live stream and the second audio/video live stream, to obtain a third audio/video live stream, and pushing the third audio/video stream to a third end for information interaction; and receiving, by the third end, audio/video content of the first end and the second end according to the third audio/video live stream.

14 Claims, 12 Drawing Sheets

(51) Int. Cl.
*H04N 21/8547* (2011.01)
*H04N 21/414* (2011.01)
*H04L 29/06* (2006.01)
*H04N 7/14* (2006.01)
*H04L 29/08* (2006.01)
*H04N 21/43* (2011.01)
*H04N 21/61* (2011.01)
*H04N 21/233* (2011.01)
*H04N 21/643* (2011.01)

(52) U.S. Cl.
CPC .......... *H04L 65/607* (2013.01); *H04L 65/608* (2013.01); *H04L 65/80* (2013.01); *H04L 67/02* (2013.01); *H04N 7/14* (2013.01); *H04N 21/233* (2013.01); *H04N 21/234* (2013.01); *H04N 21/2368* (2013.01); *H04N 21/41407* (2013.01); *H04N 21/43* (2013.01); *H04N 21/4788* (2013.01); *H04N 21/6125* (2013.01); *H04N 21/643* (2013.01); *H04N 21/8547* (2013.01)

(58) Field of Classification Search
USPC .................................. 709/202–205, 217–219
See application file for complete search history.

(56) References Cited

U.S. PATENT DOCUMENTS

| | | | | |
|---|---|---|---|---|
| 8,554,784 | B2* | 10/2013 | Nurminen | G06F 16/78 707/769 |
| 9,179,099 | B2* | 11/2015 | Wu | H04L 65/403 |
| 2007/0239825 | A1* | 10/2007 | Walter | H04N 7/152 709/204 |
| 2008/0316295 | A1 | 12/2008 | King et al. | |
| 2013/0247120 | A1* | 9/2013 | Milgramm | H04N 21/2187 725/110 |
| 2016/0057391 | A1* | 2/2016 | Block | H04N 7/152 348/14.07 |
| 2018/0063428 | A1* | 3/2018 | Rakhmanberdiyev | H04N 5/23258 |
| 2019/0281327 | A1* | 9/2019 | Li | H04N 21/2187 |
| 2020/0021892 | A1* | 1/2020 | April | H04L 65/601 |

FOREIGN PATENT DOCUMENTS

| | | |
|---|---|---|
| CN | 103338348 A | 10/2013 |
| CN | 105306468 A | 2/2016 |
| CN | 105451096 A | 3/2016 |
| CN | 105516739 A | 4/2016 |

OTHER PUBLICATIONS

The World Intellectual Property Organization (WIPO) International Search Report for PCT/CN2017/101385 dated Dec. 7, 2017 5 Pages (including translation).

The State Intellectual Property Office of the People's Republic of China (SIPO) Office Action 2 for 201610828121.4 dated May 26, 2020 10 Pages (including translation).

* cited by examiner

LIVE STREAMING METHOD AND SYSTEM, SERVER, AND STORAGE MEDIUM

RELATED APPLICATION

This application is based upon and claims priority to PCT Application No. PCT/CN2017/101385, filed on Sep. 12, 2017, which claims priority to Chinese Patent Application No. 201610828121.4, filed on Sep. 18, 2016. The two applications are incorporated by reference in their entirety.

FIELD OF THE TECHNOLOGY

The present disclosure relates to audio/video processing technologies, and in particular, to a live streaming method and system, a server, and a storage medium.

BACKGROUND OF THE DISCLOSURE

In recent years, with the rise of video live streaming services on mobile terminals, video live streaming capabilities have been embedded in many mobile applications. Video live streaming has also gradually become a basic function that is a "standard configuration" for mobile terminals. The majority of live streaming software operates in a one-way live streaming mode. That is, an anchor terminal unilaterally pushes a stream to a live streaming platform, then the stream is sent by a forwarding system of the live streaming platform and delivered by a content delivery network (CDN). Finally, the stream is pulled on a viewer terminal, and the streaming media content is played. The viewer terminal may interact with the anchor end by using an asynchronous Instant Messaging (IM) communication method, for example, by means of text/emoticon, a gift, Likes, or a game. Because of a delay of several seconds (Flash Video/Real-Time Messaging Protocol) to tens of seconds (HTTP Live Streaming) inherent in the live streaming platforms, the anchor terminal usually cannot respond to a request of the viewer terminal in a timely manner, making the interaction untimely. Interactive live streaming in this manner is actually "pseudo" interactive live streaming, combining one-way live streaming and asynchronous IM messaging capabilities.

Some live streaming applications provide a "microphone link capability connecting an anchor and viewers." This combines one-way live streaming and two-person video calls, achieving a real sense of "interactive" live streaming. In many applications, because the existing microphone link technology is implemented by modifying a conventional live streaming system, network congestion or other problems may easily cause a process of transmitting a large volume of audio/video data to terminals. As such, such systems consume large network bandwidths, which may also affect the quality of viewing of the live streaming video.

SUMMARY

To resolve the foregoing technical problems, embodiments of the present disclosure are expected to provide a live streaming method and system, a server, and a storage medium, to reduce bandwidth consumption, effectively reduce repeated exchanges of massive data, and further improve a presentation effect of live streaming.

The technical solutions of the present disclosure are implemented as follows. One aspect of the present disclosure provides a live streaming method, applied to a live streaming system. The method includes: providing, by a first end for information interaction, a first audio/video live stream for a server, and providing, by a second end for information interaction, a second audio/video live stream for the server. The method further includes performing, by the server, coding and processing on the first audio/video live stream and the second audio/video live stream, to obtain a third audio/video live stream, and pushing the third audio/video stream to a third end for information interaction; and receiving, by the third end, audio/video content of the first end and the second end according to the third audio/video live stream.

Another aspect of the present disclosure provides a live streaming method, applied to a server side. The method includes the steps of collecting a first audio/video live stream from a first end client for information interaction and a second audio/video live stream from a second end client for information interaction. The first audio/video live stream includes a first audio live stream and a first video live stream, and the second audio/video live stream includes a second audio live stream and a second video live stream. The method also includes performing superposition coding on the first video live stream and the second video live stream to output a third video live stream. The method further includes performing audio mixing on the first audio live stream and the second audio live stream to obtain a third audio live stream; and synchronizing and packaging the third audio live stream and the third video live stream, to obtain a third audio/video live stream, and pushing the third audio/video live stream to a third end client.

Another aspect of the present disclosure provides a live streaming system, including a first end client for information interaction, a second end client for information interaction, a server, and a third end client for information interaction, the first end, the second end, and the third end clients exchanging data by using the server. The first end client is configured to provide a first audio/video live stream for the server. The second end client is configured to provide a second audio/video live stream for the server. The server is configured to perform coding and processing on the first audio/video live stream and the second audio/video live stream, to obtain a third video live stream, and push the third video stream to the third end client; and the third end is configured to play audio/video content of the first end and the second end according to the third video live stream.

The present disclosure further provides a server, including: a processor, and a memory, configured to store a computer program capable of running on the processor, and the processor being configured to perform: collecting a first audio/video live stream from a first end client for information interaction and a second audio/video live stream from a second end client for information interaction. The first audio/video live stream includes a first audio live stream and a first video live stream, and the second audio/video live stream includes a second audio live stream and a second video live stream. The processor is also configured to perform superposition coding on the first video live stream and the second video live stream to output a third video live stream. The processor is also configured to perform audio mixing on the first audio live stream and the second audio live stream to obtain a third audio live stream; and synchronize and package the third audio live stream and the third video live stream, to obtain a third audio/video live stream, and push the third audio/video live stream to a third end client.

By means of the foregoing technical implementation solutions, because after collecting audio/video data of the first end for information interaction and audio/video data of the second end for information interaction, the server directly processes the collected audio/video data and then directly transmits final audio/video data to the third end for information interaction. In embodiments of the present disclosure, transmission of a large volume of data between the first end for information interaction, the second end for information interaction, and the third end for information interaction after the server collects the foregoing audio/video data is avoided. Therefore, bandwidth consumption during information interaction may be reduced, repeated exchanges of a large volume of data are effectively reduced, and a presentation effect of live streaming may be further improved.

DESCRIPTION OF EMBODIMENTS

The following clearly and completely describes the technical solutions in the embodiments of the present disclosure with reference to the accompanying drawings in the embodiments of the present disclosure.

Figure 1:
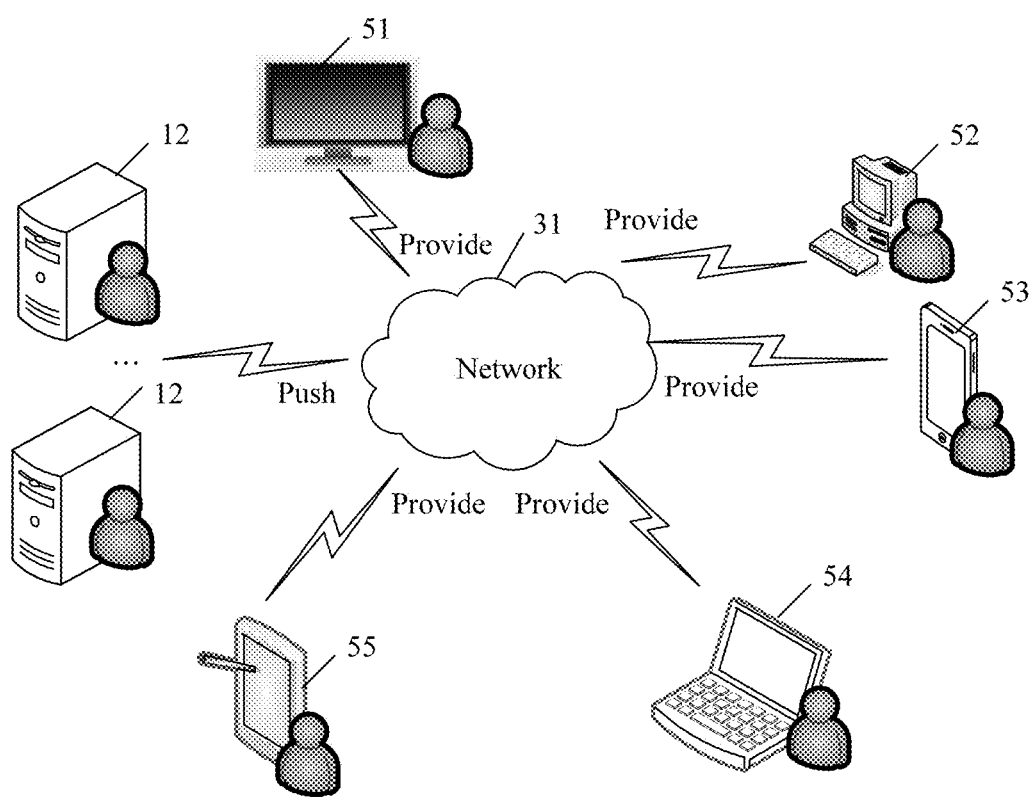
FIG. 1 is a schematic diagram of a live streaming system according to an embodiment of the present disclosure.

FIG. 1 is a schematic diagram of a live streaming system according to an embodiment of the present disclosure. FIG. 1 includes one or more servers 12, terminal devices 51 to 55, and a network 31. The network 31 includes network entities such as a router and a gateway, which are not shown in the figure. The terminals 51 to 55 perform information interaction with the server by using a wired network or a wireless network connection, so that related data information is collected from the terminals 51 to 55 and transmitted to the server. Types of the terminals are shown in FIG. 1, and may include mobile phone (a terminal 53), tablet computer or PDA (a terminal 55), desktop computer (a terminal 52), PC (a terminal 54), and smart TV (a terminal 51), and other computing devices (not shown). Various applications required by a user are installed in the terminals, such as an application with an entertainment function (such as a video application, an audio playback application, a game application, reader software, or a live streaming application), and an application with a service function (such as a map navigation application, a group purchasing application, or a photographing application).

The following embodiments are implemented based on the foregoing computer architecture.

Figure 2:
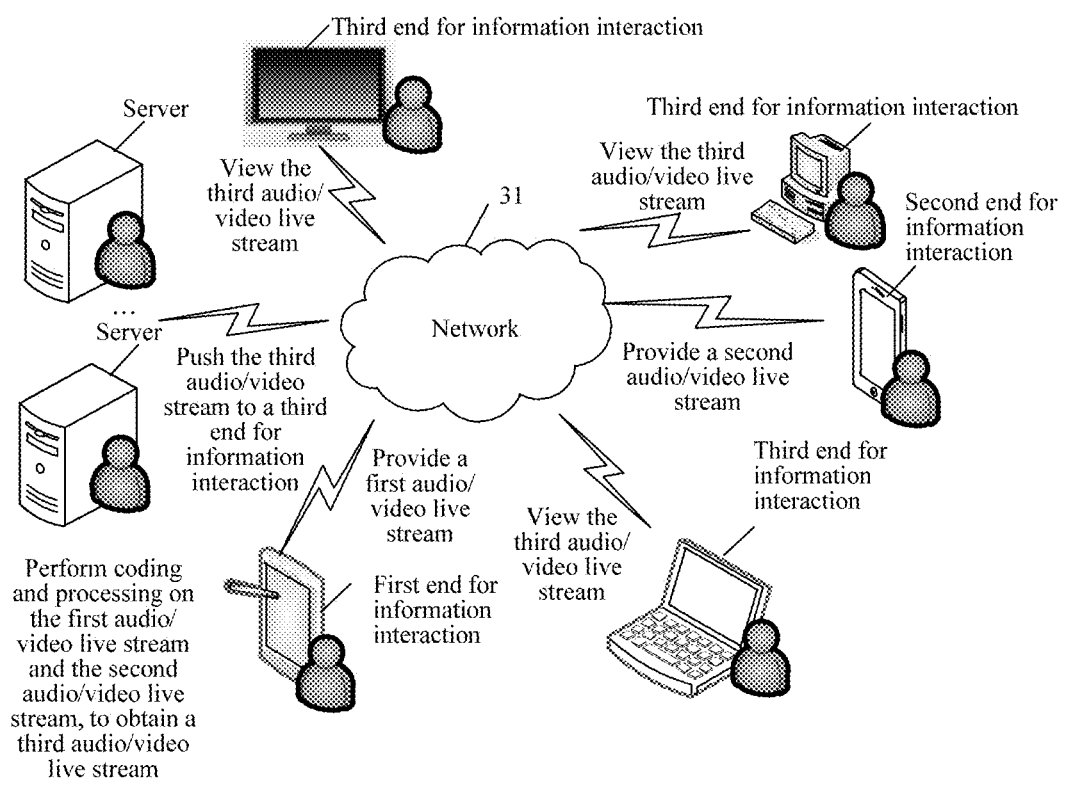
FIG. 2 is a first diagram of an application scenario of a live streaming method according to an embodiment of the present disclosure.

An embodiment of the present disclosure provides a live streaming method, as shown in FIG. 2, applied to a live streaming system. The live streaming method may include the following steps.

S101. A first end for information interaction provides a first audio/video live stream for a server. In the present disclosure, a first end or a first end client, a second end or a second end client, a third end or a third end client may refer to a user terminal or a software application installed in the user terminal.

S102. A second end for information interaction provides a second audio/video live stream for a server.

It should be noted that an application scenario of this embodiment of the present disclosure may be a case in which video calls for live streaming may be implemented during live streaming.

The first end for information interaction in this embodiment of the present disclosure may be a live streaming client of a terminal. Herein, the first end for information interaction may be construed as an anchor client (anchor end) hosting a live show. The second end for information interaction may be construed as a video call participant client (video call participant end) having a video call with the anchor.

For example, each client in this embodiment of the present disclosure may be configured on the terminal. The terminal may be an intelligent electronic device with a function of hosting a video call for live streaming, such as a smartphone, a smart television (TV), or a tablet computer. This is not limited in this embodiment of the present disclosure.

It can be understood that the live streaming method provided in this embodiment of the present disclosure may be applied to the live streaming system, and this embodiment of the present disclosure provides live streaming with a function of having a video call. Therefore, a system architecture of the live streaming system includes the anchor end (first end for information interaction), the video call participant end (second end for information interaction), a viewer end (third end for information interaction), and the server, and communication is performed by using a network.

In this embodiment of the present disclosure, live streaming interaction may be performed on the viewer end for audio and videos of both the anchor end and the video call participant end. The anchor end (first end for information interaction) transmits audio/video data thereof, that is, a first audio/video live stream, to a backend server by using a collecting device of the anchor end. The video call participant end (second end for information interaction) also transmits audio/video data thereof, that is, a second audio/video live stream, to the backend server by using a collecting device of the video call participant end. That is, data collected in this way is all original audio and video data.

It should be noted that the first end for information interaction in this embodiment of the present disclosure may be considered as a terminal. Therefore, the anchor end may collect audio data and video data of the anchor by using one or more collecting devices disposed on the terminal of the anchor, and a video call participant may also collect audio data and video dada of the video call participant by using the collecting device disposed on the terminal of the video call participant. Specifically, the collecting device in this embodiment of the present disclosure may include: a video collecting device and an audio collecting device. For example, the anchor may collect video data of the anchor by using a camera on a mobile phone owned by the anchor, and collect audio data by using a microphone on the mobile phone owned by the anchor, to obtain a first audio/video live stream. Similarly, the video call participant may also implement collection of a second audio/video live stream in the foregoing manner.

Further, the video collection device in this embodiment of the present disclosure may be a camera lens or a video camera, for example, an image sensor (CCD, Charge-coupled Device) or a CMOS; and an audio collector may be a microphone or an audio monitoring unit, for example, an acoustoelectric conversion device (microphone) or an audio amplifier circuit. This is not specifically limited in this embodiment of the present disclosure as long as the devices or circuit can receive video or audio data.

It should be noted that the first end for information interaction, the second end for information interaction, and the third end for information interaction in this embodiment of the present disclosure is each a functional and collective name, and the number of the foregoing clients is not specifically limited. In addition, the video call participant end and the viewer end in this embodiment of the present disclosure may exchange roles. That is, if the viewer end participates in a video call, it may be considered as a video call participant end, and a previous video call participant end also functions as a viewer end at the same time to view live streaming of another client and is own live streaming.

In short, in this embodiment of the present disclosure, none of the clients participating in information interaction are of a fixed role. Rather, they may change in different environments. However, regardless of the changes, there are always clients functioning as a video call participant end and a viewer end. In addition, a client for information interaction may be an anchor itself hosting a live program. Therefore, implementation of a specific function of a client is not limited in this embodiment of the present disclosure.

It should be noted that in this embodiment of the present disclosure, a client for information interaction may be software such as a live streaming application installed on a terminal.

S103. The server performs coding and processing operations on the first audio/video live stream data and the second audio/video live stream data, to obtain a third audio/video live stream, and pushes the third audio/video stream data to a third end for information interaction.

Both the first end for information interaction and the second end for information interaction provide respective corresponding audio/video live streams of a user for the server. That is, the server collects the first audio/video live stream data and the second audio/video live stream data. Therefore, the server may perform coding and processing on the first audio/video live stream data and the second audio/video live stream data, to obtain the third audio/video live stream data, and push the third audio/video stream data to the third end for information interaction (viewer end).

In an embodiment, the first audio/video live stream data may include a first audio live stream data and a first video live stream data. The second audio/video live stream data may include a second audio live stream data and a second video live stream data.

Specifically, after collecting the first audio/video live stream data and the second audio/video live stream data, the server needs to process all the directly collected audio/video live stream data. Specifically, because the server collects multiple audio/video live streams, the server needs to perform video combination and transcoding on the video live streams (the first video live stream and the second video live stream), and needs to perform audio mixing on the audio live streams (the first audio live stream and the second audio live stream). Finally, the server encapsulates a processed third audio live stream and third video live stream, and outputs a third audio/video live stream data to a live streaming platform component, so that the third end for information interaction (viewer end) can play the third audio/video live stream. In this way, the process of pushing the third audio/video live stream to the third end for information interaction is completed.

It should be noted that the video combination and transcoding are a process in which multiple video images are combined and recoded, and the audio mixing is a process of mixing multiple pieces of audio data into one piece of audio data.

Specifically, in this embodiment of the present disclosure, the server may perform coding (digitization) and processing (such as audio/video mixing, or packaging and encapsulation) on original audio/video data (the first audio/video live stream and the second audio/video live stream) by using related hardware or software, to obtain available audio/video data (the third audio/video live stream).

The coding may use the following encoding modes: constant bitrate (CBR) coding and variable bit rate (VBR) coding. Correspondingly, there may be the following coding formats.

Video data formats may include H.265, H.264, MPEG-4, or the like, where a video packaging container includes a TS, a multimedia container (MKV), audio video interleaving (AVI), Moving Picture Experts Group 4 (MP4), or the like. Audio data formats may include G.711µ, advanced audio coding (AAC), Opus, or the like, where an audio encapsulation container includes MP3, OGG (OGG Vorbis), AAC, or the like. A specific implementation form is not limited in this embodiment of the present disclosure.

It should be noted that the process in which the server obtains the third audio/video live stream and sends the third audio/video live stream data to the live streaming platform component may be referred to a stream pushing process.

In this embodiment of the present disclosure, the streaming pushing is the process of sending the third audio/video live stream to the live streaming platform component by using a streaming media protocol.

In some embodiments, most live streaming applications use the Real-Time Messaging Protocol (RTMP), and some use the Microsoft Media Server Protocol (MMS). A specific manner of the streaming media protocol is not limited in this embodiment of the present disclosure.

The RTMP is an open protocol developed for audio, video, and data transmission between a flash player and a server, and it has three variations as follows:

1. A plaintext protocol that works on top of the Transmission Control Protocol (TCP) and uses port 1935;
2. RTMPT that is encapsulated in a Hypertext Transfer Protocol (HTTP) request and can traverse firewalls; and
3. RTMPS that is similar to RTMPT but uses an HTTPS connection.

In other words, the RTMP is used by a flash for object, video, and audio transmission. This protocol is established over the TCP or a polling HTTP.

The RTMP is similar to a container for a data packet. The data may be AMF-format data or video/audio data in FLV. A single connection may transmit multiple network streams by using different channels. Data packets on these channels are transmitted in fixed sizes. In this embodiment of the present disclosure, the third audio/video live stream is transmitted by using the RTMP.

It can be understood that the third audio/video live stream in this embodiment of the present disclosure is an audio/video live stream data that is obtained by combining multiple audio/video streams such as the first audio/video live stream and the second audio/video live stream into one audio/video stream. Such a third audio/video live stream may include both audio and video data on the anchor end and audio and video data on the video call participant end. In addition, the foregoing audio and video data may exist at the same time and the audio or video data would not interfere with each other.

S104. The third end views audio/video content of the first end and the second end according to the third audio/video live stream data.

It should be noted that stream pulling is a process in which the server obtains audio/video data.

The server pushes the third audio/video live stream data to the live streaming platform component. When a user of the third end for information interaction intends to view a live program of the anchor, a real-time third audio/video live stream is obtained from the live streaming platform component by means of stream pulling. In this way, the third end (the third end for information interaction, for example, a viewer end) may play the audio/video content of the first end and the second end according to the third audio/video live stream, which include the, live streaming content ongoing on the anchor end and the video call participant end at the moment.

Specifically, after the third end for information interaction obtains the third audio/video live stream by means of stream pulling, because coding and processing have been performed on the third audio/video live stream, the third end needs to decode the third audio/video live stream. That is, the third end may decode the received coded audio/video data by using related hardware or software, to obtain audio/video data of an image/sound that can be directly displayed, and display the decoded third audio/video live stream in a form of a corresponding image or sound on a display or through a speaker.

For example, in this embodiment of the present disclosure, the display may include: a television screen, a monitor screen, or the like, and the speaker may include: an earphone, a loudspeaker, or the like. This is not specifically limited in this embodiment of the present disclosure.

It should be noted that for a corresponding coder in this embodiment of the present disclosure, there is usually a corresponding decoder, and there are also third-party decoding plug-ins. In other words, the third end for information interaction in this embodiment of the present disclosure may have a decoder or a third-party decoding plug-in corresponding to coding by the server.

In one example, the RTMP is used during all current live streaming. In this case, an RTMP server implements streaming pulling, and then provides an RTMP video service. Generally, the RTMP server also provides HTTP Live Streaming (HLS), and slices a video/audio stream into TS streams. Then the user (viewer end) may directly play streaming media of xxx.m3u8 (the third audio/video live stream) format.

It can be understood that the viewer end may receive only one streaming media data (the third audio/video live stream), the video call participant end does not need to perform any additional operation and outputting, and an action that consumes resources is performed in background, thereby reducing bandwidth consumption of a terminal, reducing the possibility of network congestion and jitters caused by a high bandwidth consumption, and effectively reducing the requirement on terminal hardware performance.

Figure 3:
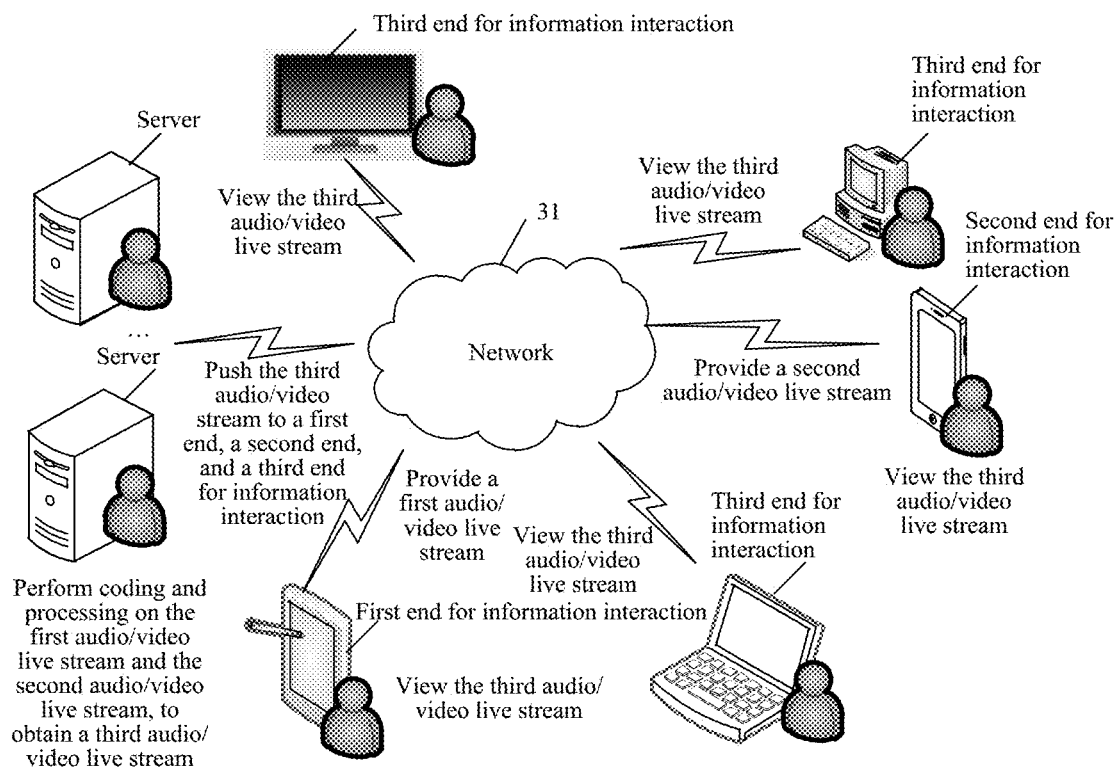
FIG. 3 is a second diagram of an application scenario of a live streaming method according to an embodiment of the present disclosure.

Further, as shown in FIG. 3, after S103, the live streaming method provided in this embodiment of the present disclosure may further include S105 to S107.

S105. The server pushes the third audio/video stream data to the first end and the second end.

S106. The first end plays the audio/video content of the first end and the second end according to the third audio/video live stream.

S107. The second end plays the audio/video content of the first end and the second end according to the third audio/video live stream.

In this embodiment of the present disclosure, the first end for information interaction and the second end for information interaction may alternatively function as viewer ends, to play their own audio/video content. Therefore, after obtaining the third audio/video live stream, the server further pushes the third audio/video live stream data to the foregoing first end and the foregoing second end. In this case, the first end and the second end may play content on the anchor end and the video call participant end during the live streaming while perform live streaming, thereby implementing real-time interaction and exchanges.

It should be noted that the process in which the server pushes the third audio/video live stream data to the first end for information interaction and the second end for information interaction has the same principle as the process in which the server pushes the third audio/video live stream data to the third end for information interaction. The process in which the first end for information interaction and the second end for information interaction play the third audio/video live stream has a same principle as the process in which the third end for information interaction views the third audio/video live stream. Therefore, details are not described again.

Figure 4:
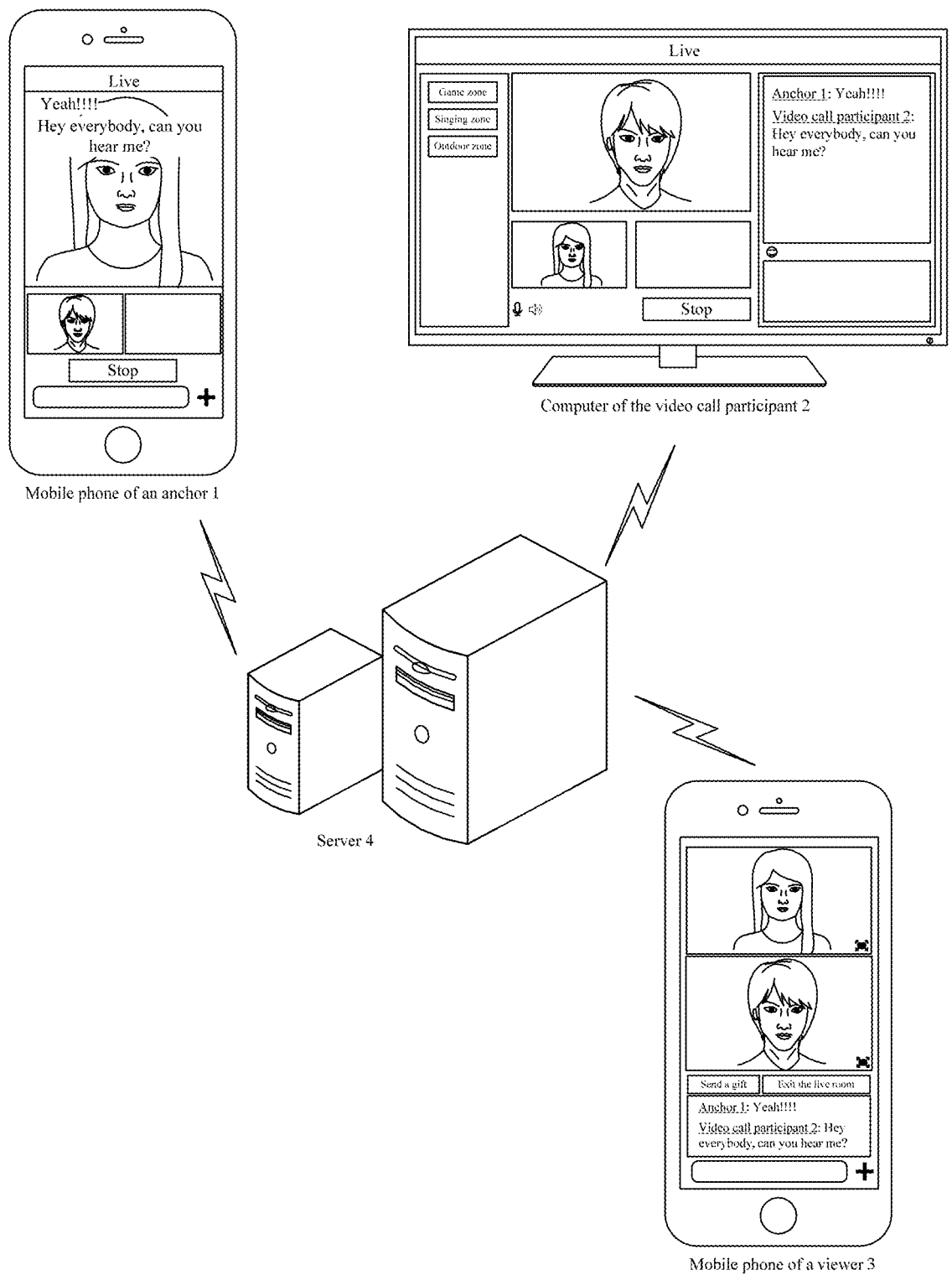
FIG. 4 is a first diagram of an exemplary live streaming application scenario according to an embodiment of the present disclosure.

Referring to FIG. 4, FIG. 4 is a schematic diagram of an application scenario. In this embodiment, the anchor end is a mobile phone of an anchor 1, the video call participant end is a computer of a video call participant 2, the viewer end is a mobile phone of a viewer 3, and the server is a server 4. When the anchor 1 performs live streaming, the video call participant 2 may perform real-time interaction with the anchor 1. For example, anchor 1 says: Yeah!!!! The video call participant 2 says: Hey everybody, can you hear me? Then, the server 4 may collect audio and avatar live streams of the anchor 1 and the video call participant 2, perform coding and processing on the live streams, and push the live streams on which the coding and processing have been performed to the mobile phone of the viewer 3. The viewer 3 may directly view video and audio live stream content of anchor 1 and the video call participant 2.

It can be understood that because after collecting audio/video data of the first end for information interaction and audio/video data of the second end for information interaction, the server directly processes the collected audio/video data and then directly transmits final audio/video data to the third end for information interaction, transmission of massive data between the first end for information interaction, the second end for information interaction, and the third end for information interaction after the server collects the foregoing audio/video data may be avoided. Therefore, bandwidth consumption during information interaction may be reduced, repeated exchanges of massive data are effectively reduced, and a presentation effect of live streaming is further improved.

Figure 5:
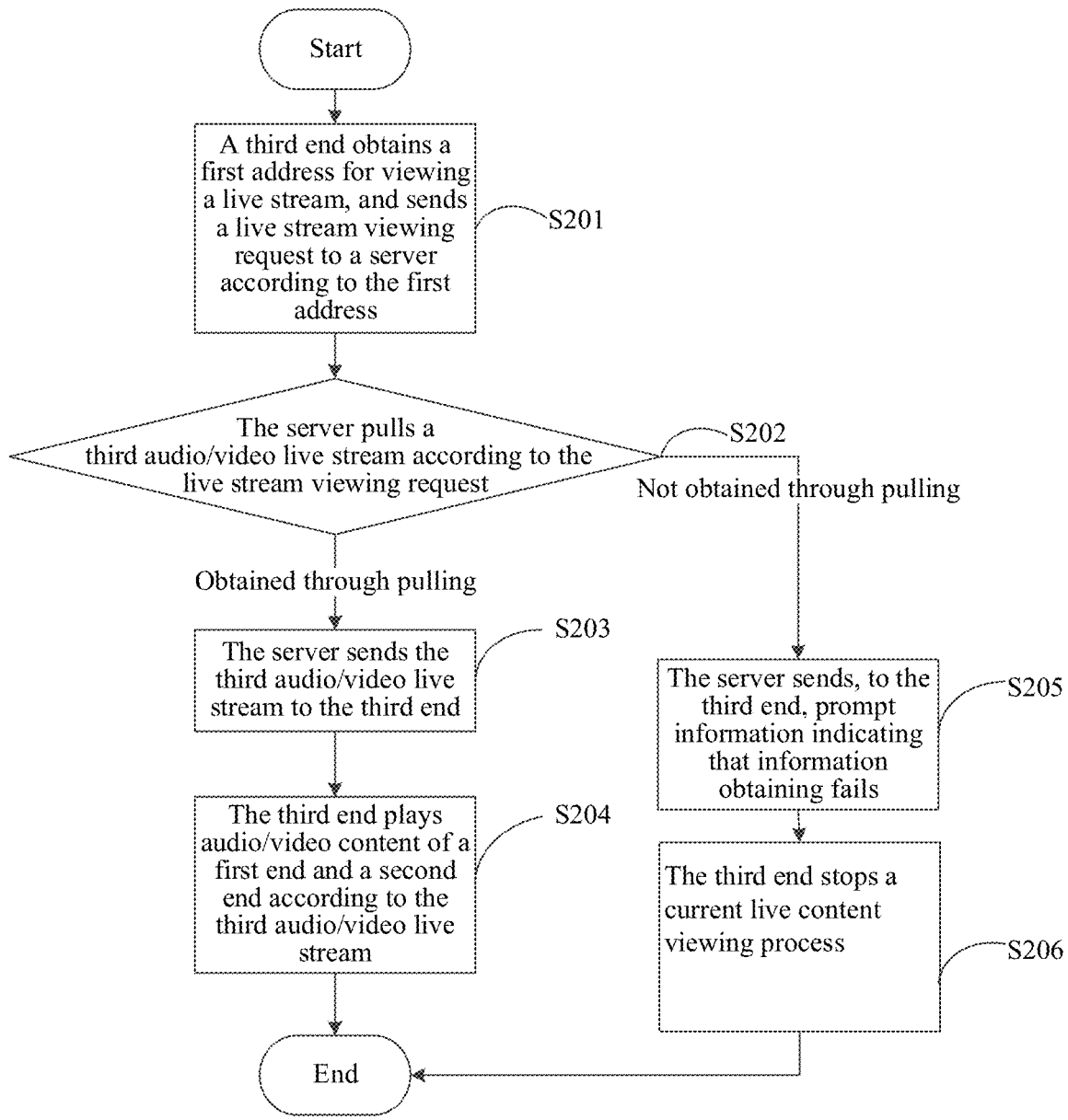
FIG. 5 is a flowchart for viewing live content according to an embodiment of the present disclosure.

Based on implementation of this embodiment, as shown in FIG. 5, a specific process of the viewing, by the third end, audio/video content of the first end and the second end according to the third audio/video live stream in the live streaming method provided in this embodiment of the present disclosure may include the following steps.

S201. The third end obtains a first address for viewing a live stream, and sends a live stream viewing request to the server according to the first address.

In this embodiment of the present disclosure, the server may push the third audio/video live stream to the third end for information interaction. This, reflected in use, may be: The server may push the third audio/video live stream to a terminal on which the third end for information interaction is located. Therefore, the user of the third end for information interaction may obtain, by means of a clicking or touch operation, a first address for viewing a live stream, and sends a live stream request to the server according to the first address, to request an audio/video live stream from the server or pull an audio/video live stream. When the third end for information interaction intends to view the third audio/video live stream pushed by the server onto the terminal of the third end for information interaction, the user of the third end for information interaction clicks an image or link corresponding to the third audio/video live stream. In this way, the third end obtains the first address for viewing the third audio/video live stream, sends a live stream viewing request to the server according to the first address, and request, by means of stream pulling and from a CDN in the live streaming platform component of the server, the third audio/video live stream for viewing.

It should be noted that a live streaming application on the terminal on which the third end for information interaction is located may display an interface or image of live streaming being performed on the first end performing information interaction. In this case, the user of the third end for information interaction obtains, by clicking the interface or image of the live streaming, the first address for viewing a live stream. Therefore, the third end for information interaction may send the live stream viewing request to the server according to the first address.

It should be further noted that in this embodiment of the present disclosure, the third end for information interaction may obtain, by using the Moments or a live streaming address shared by a friend, the first address for viewing a live stream, and send the live stream viewing request to the server according to the first address.

Further, the first address in this embodiment of the present disclosure may be an RTMP address, or a URL address. A specific address form may be determined according to a specific situation in actual practice. This is not limited in this embodiment of the present disclosure.

Figure 6:
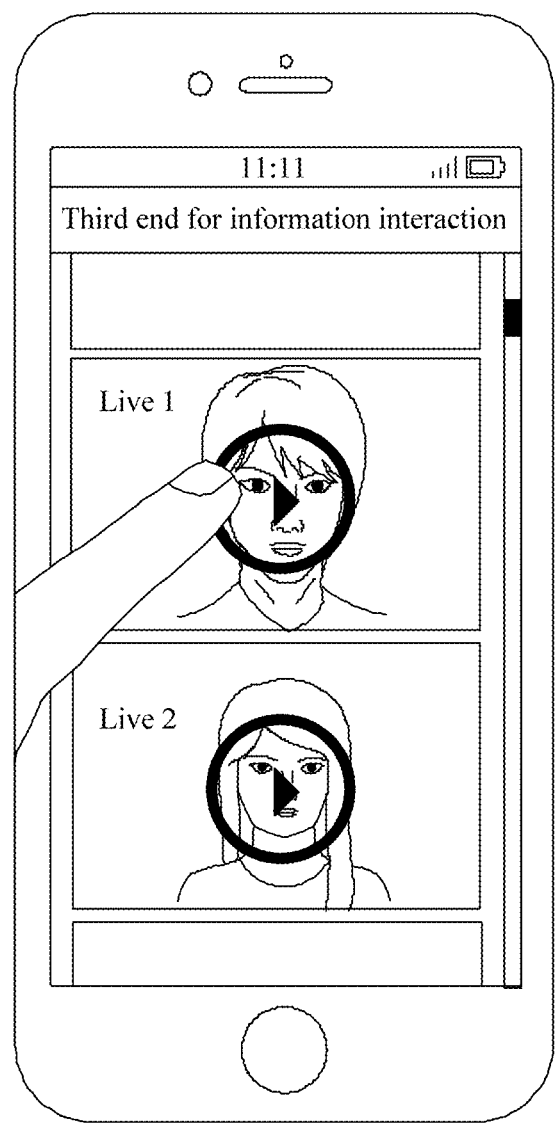
FIG. 6 is a second diagram of an exemplary live streaming application scenario according to an embodiment of the present disclosure.
Figure 7:
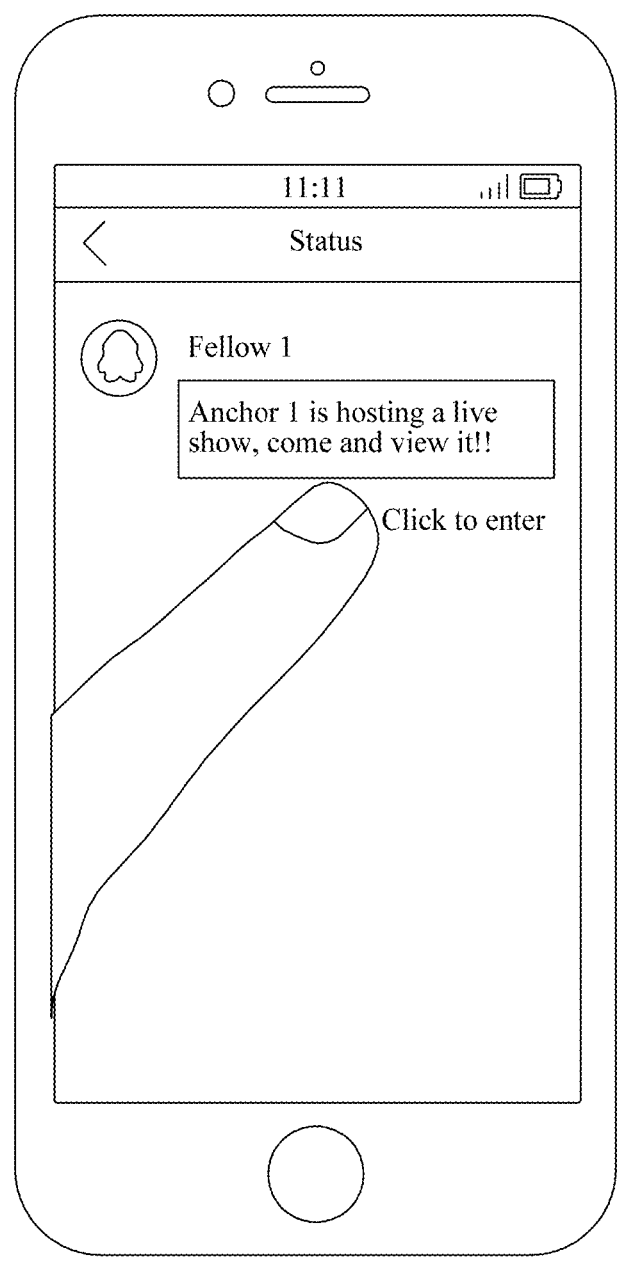
FIG. 7 is a third diagram of an exemplary live streaming application scenario according to an embodiment of the present disclosure.

In one example, as shown in FIG. 6, a process in which a viewer 1 (third end for information interaction) clicks an interface of live streaming 1 is a process in which the third end obtains the first address for viewing a live stream. As shown in FIG. 7, a companion 1 shares a live streaming link of an anchor 1. Therefore, the process in which the viewer 1 (third end for information interaction) clicks the live streaming link is a process in which the third end obtains the first address for viewing a live stream.

S202. The server pulls the third audio/video live stream according to the live stream viewing request.

Because the third end for information interaction sends the live stream viewing request to the server, the server may start the process of pulling the third audio/video live stream according to the live stream viewing request. A result of pulling the third audio/video live stream by the server may be a result indicating successful pulling or a result indicating an unsuccessful pulling.

It should be noted that the process in which the server pulls the third audio/video live stream according to the live stream viewing request is a process in which the CDN in the live streaming platform component in the server pulls (retrieval) the third audio/video live stream from a live streaming module (a module in the server for pushing the third audio/video live stream) in the live streaming platform component.

In one example, when the user (third end for information interaction) accesses a URL (first address), if the CDN of the server parsed by the server according to the first address does not cache content of a response (third audio/video live stream), or a cache has expired, the content is obtained back from a site of origin (live streaming module).

It should be noted that the CDN does not proactively pull the content from the site of origin in the absence of access by the third end for information interaction.

S203. The server sends the third audio/video live stream to the third end if the third audio/video live stream is obtained through pulling.

After the server pulls the third audio/video live stream according to the live stream viewing request, when the CDN in the server obtains the third audio/video live stream through pulling from the site of origin, the CDN may send the third audio/video live stream to the third end. That is, the CDN pushes the third audio/video live stream to the third end for information interaction.

S204. The third end plays the audio/video content of the first end and the second end according to the third audio/video live stream.

After the third end for information interaction obtains the third audio/video live stream sent by the server, because the third audio/video live stream is processed data of the audio/video data collected from the first end for information interaction and the second end for information interaction, the third end may play the audio/video content of the first end and the second end according to the third audio/video live stream.

A specific description of the process of S204 is the same as the description of S104. This is not limited in this embodiment of the present disclosure.

S205. The server sends, to the third end if the third audio/video live stream is not obtained through pulling, prompt information indicating that information obtaining fails.

After the server pulls the third audio/video live stream according to the live stream viewing request, when the CDN in the server does not obtain the third audio/video live stream through pulling from the site of origin, the CDN may send, to the third end, prompt information indicating that information obtaining fails. That is, the CDN fails to push the third audio/video live stream to the third end for information interaction.

S206. The third end ends a current live content viewing session according to the prompt information indicating that information obtaining fails.

After the third end for information interaction receives the prompt information indicating that information obtaining fails, it indicates that the third end has a problem in viewing the live streaming. Therefore, the third end ends the current live content viewing session according to the prompt information indicating that information obtaining fails.

Specifically, the third end for information interaction may display, to the user of the third end for information interaction, a prompt indicating that the live streaming fails or obtaining of the live streaming data fails, to end the current live content viewing session.

It should be noted that S203 and S204, and S205 and S206 in this embodiment of the present disclosure are optional steps after S202. In this embodiment of the present disclosure, after S202, S203 and S204 may be performed, or S205 and S206 may be performed. A specific execution order after S202 is determined according to a situation of an actual implementation. This is not limited in this embodiment of the present disclosure.

Figure 8:
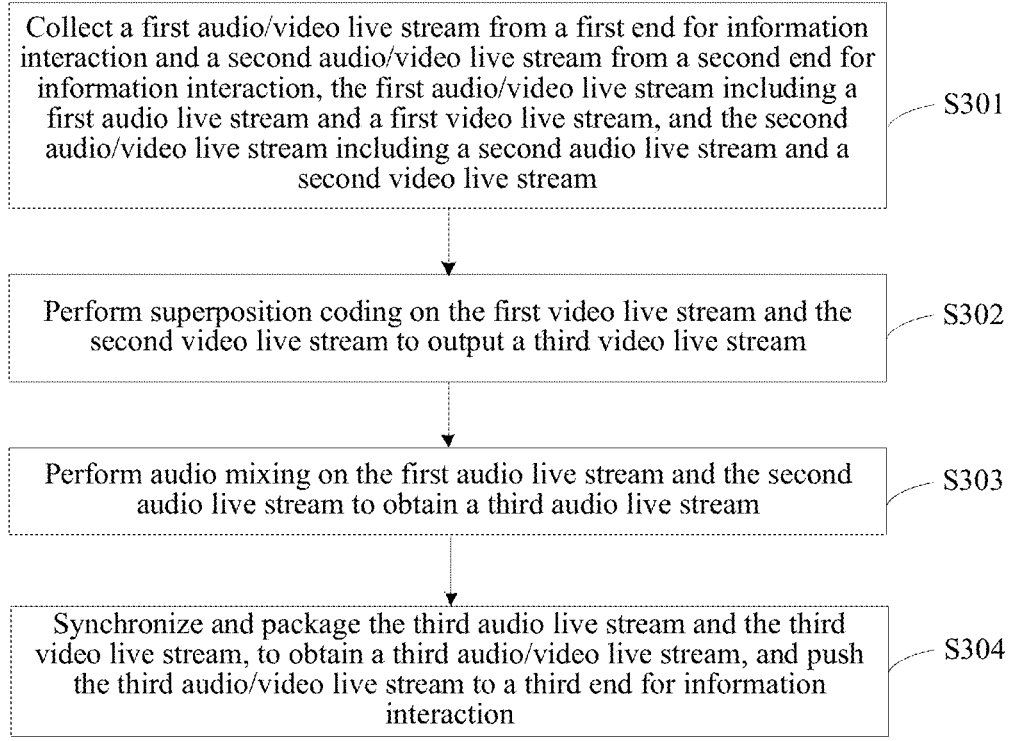
FIG. 8 is a first flowchart of a live streaming method according to an embodiment of the present disclosure.

An embodiment of the present disclosure provides a live streaming method, as shown in FIG. 8, applied to a server side. The method may include the following steps:

S301. Collect a first audio/video live stream from a first end for information interaction and a second audio/video live stream from a second end for information interaction, the first audio/video live stream including a first audio live stream and a first video live stream, and the second audio/video live stream including a second audio live stream and a second video live stream.

The process in which the server collects the first audio/video live stream from the first end for information interaction and the second audio/video live stream from the second end for information interaction is a process in which the first end and the second end provide the first audio/video live stream and the second audio/video live stream for the server. Therefore, the process in which the server collects the first audio/video live stream from the first end for information interaction and the second audio/video live stream from the second end for information interaction is the same as the descriptions of S101 and S102.

It should be noted that the server in this embodiment of the present disclosure may include: a forwarding module, a video combination and transcending module, an audio mixing module, a streaming media module and a live streaming platform component. The live streaming platform component includes: a live streaming module and a CDN module.

The processing of collecting the first audio/video live stream and the second audio/video live stream in this embodiment of the present disclosure is performed by the forwarding module in the server.

In one example, to collect an audio/video live stream, the server needs to use a framework AVFoundation.Framework, to obtain audio/video data from callback of a session captureSession.

S302. Perform superposition coding on the first video live stream and the second video live stream to output a third video live stream.

It should be noted that the video combination and transcending module in the server performs the process of performing superposition coding on the first video live stream and the second video live stream to output a third video live stream.

S303. Perform audio mixing on the first audio live stream and the second audio live stream to obtain a third audio live stream.

It should be noted that the audio mixing module in the server performs the process of performing audio mixing on the first audio live stream and the second audio live stream to obtain a third audio live stream.

In an embodiment, the server may perform hardcoding or softcoding on an audio/video live stream. Hardcoding is to use a CPU resource to compress audio/video data. Softcoding is opposite to hardcoding. Currently, softcoding is widely implemented by using an FFmpeg library in combination with a code library, where FFmpeg+X624 is used to code video data YUV/RGB to output H264 data, and FFmpeg+FDK_AAC is used to code audio data pulse code modulation (PCM) to output AAC data.

S304. Synchronize and package the third audio live stream and the third video live stream, to obtain a third audio/video live stream, and push the third audio/video live stream to a third end for information interaction.

Specific descriptions of S302 to S304 in this embodiment of the present disclosure are the same as the process described in S103.

It should be noted that in this embodiment of the present disclosure, the streaming media module of the server synchronizes the third audio live stream and the third video live stream according to a time stamp, to obtain a fourth audio/video live stream, packages the fourth audio/video live stream, to obtain the third audio/video live stream, and pushes the third audio/video live stream to the third end by using a live streaming platform in the live streaming platform component.

Specifically, that the server pushes the third audio/video live stream to the third end for information interaction is: A CDN in the live streaming platform component receives the live stream viewing request sent by the third end; pulls the third audio/video live stream according to the live stream viewing request; and sends the third audio/video live stream to the third end if the third audio/video live stream is obtained through pulling; or sends, to the third end if the third audio/video live stream is not obtained through pulling, prompt information indicating that information obtaining fails. Detailed descriptions of the foregoing process are the same as those of the process in Embodiment 2.

In an embodiment, the server encapsulates an audio/video live stream according to a selected streaming media protocol, to package the audio/video live stream as a packet. The server may send, according to the selected streaming media protocol, a corresponding instruction on connection to the server. The packet data may be sent after a successful connection to the server. In this embodiment of the present disclosure, the packet data is sent to the live streaming module.

It should be noted that the end that receives the third audio/video live stream needs to have a corresponding decoding module configured in it. Decoding is to decompress the obtained data, to obtain the original data through restoration. Opposite to the foregoing coding, decoding is to change H264 to YUV, and AAC to PCM. Hard decoding or soft decoding may be used for decoding. Soft decoding is to use a CPU resource to decompress data, and an FFmpeg decoding manner is used. In terms of hard decoding, for an iOS platform, VideoToolbox.Framework (where the framework can be used only on iOS 8.0 and later-release systems) may be used to perform hard decoding on video data. On an Android platform, MediaCodec may be used to perform soft decoding on video data (audio/video live stream).

Figure 9:
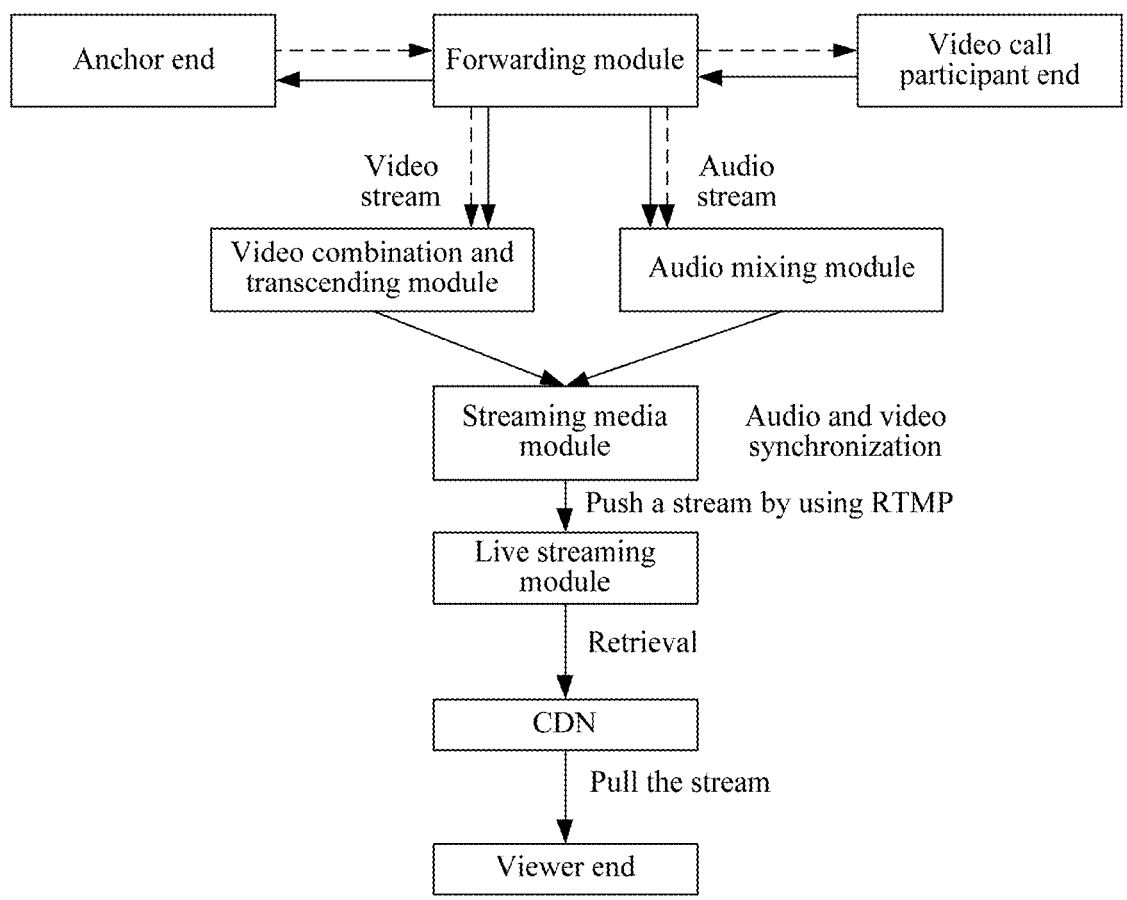
FIG. 9 is an exemplary flowchart of a live streaming method according to an embodiment of the present disclosure.

In one example, as shown in FIG. 9, an anchor end and a video call participant end have a real-time audio/video call, and all audio/video data (audio/video stream) is collected by using a forwarding module. In FIG. 9, when the forwarding module is collecting audio/video data, arrows with dashed lines are used to represent audio/video data transmission involving an anchor end, arrows with solid lines are used to represent audio/video data transmission involving a video call participant end, and the anchor end and the video call participant end may exchange audio/video data by using the forwarding module. The forwarding module respectively forwards video streams and audio streams of the anchor end and all video call participant ends to a video combination and transcending module and an audio mixing module. In FIG. 9, forwarding of the audio stream and the video stream of the anchor end by the forwarding module forward is represented by using arrows with dashed lines, and forwarding of the audio stream and the video stream of the video call participant end by the forwarding module forward is represented by using arrows with solid lines. Subsequently, the video combination and transcending module decodes the video streams, combines images, then codes the combined images into a video stream, and outputs the video stream to the streaming media module. An audio mixing system performs audio mixing on all audio data, and outputs it to the streaming media module. The streaming media module synchronizes the processed audio stream and video stream according to a time stamp, encapsulates them as a media stream (for example, a RTMP stream), and pushes the media stream to the live streaming module (a retrieval judgment is made). In this way, the viewer end may view, by means of CDN stream pulling, streaming data (third audio/video live stream) on which the video combination/audio mixing has been performed.

Figure 10:
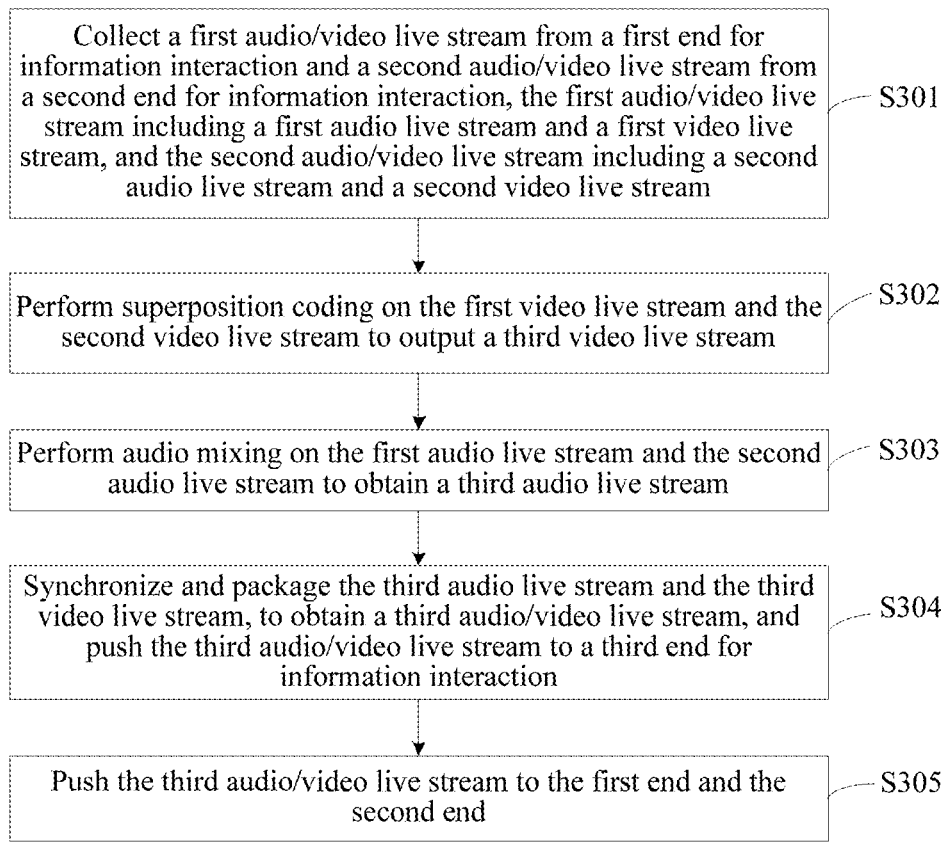
FIG. 10 is a second flowchart of a live streaming method according to an embodiment of the present disclosure.

Further, as shown in FIG. 10, after S304, the live streaming method provided in this embodiment of the present disclosure may further include S305. Details are as follows:

S305. Push the third audio/video live stream to the first end and the second end.

It should be noted that the CDN in the server performs the process of pushing the third audio/video live stream to the first end and the second end, and descriptions of the foregoing process are the same as those of the process of S105 to S107.

It can be understood that because after collecting audio/video data of the first end for information interaction and audio/video data of the second end for information interaction, the server directly processes the collected audio/video data and then directly transmits final audio/video data to the third end for information interaction, transmission of massive data between the first end for information interaction, the second end for information interaction, and the third end for information interaction after the server collects the foregoing audio/video data is avoided. Therefore, bandwidth consumption during information interaction is reduced, repeated exchanges of massive data are effectively reduced, and a presentation effect of live streaming is further improved.

Figure 11:
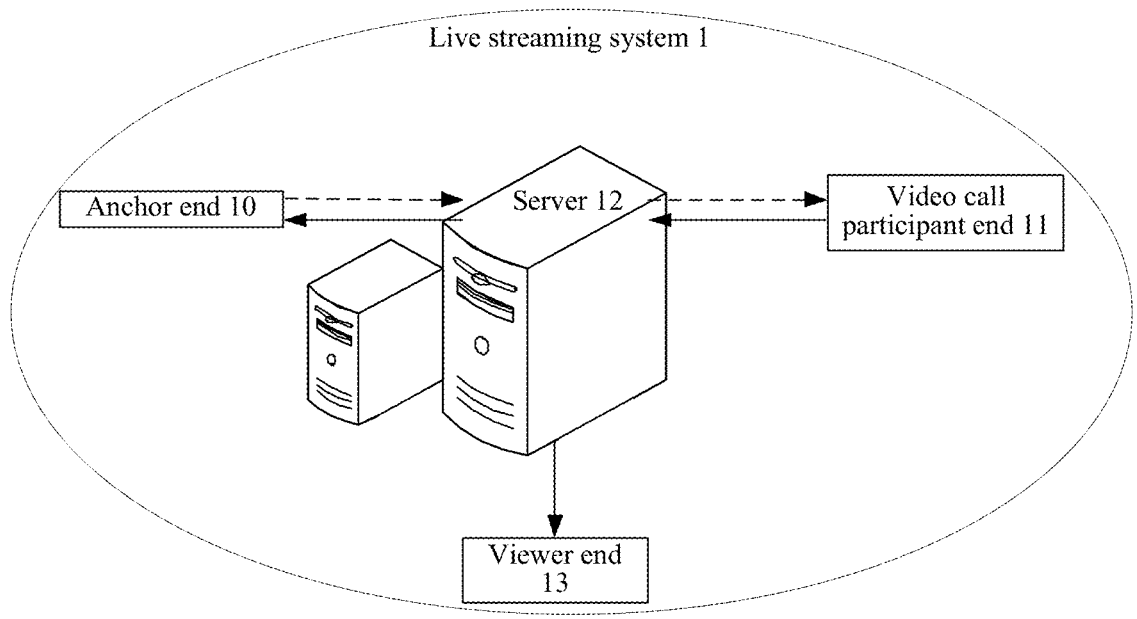
FIG. 11 is a first block diagram of a live streaming system according to an embodiment of the present disclosure.

As shown in FIG. 11, an embodiment of the present disclosure provides a live streaming system 1. The live streaming system 1 may include: a first end 10 for information interaction, a second end 11 for information interaction, a server 12, and a third end 13 for information interaction. The first end 10, the second end 11, and the third end 13 exchange data by using the server 12.

The first end 10 is configured to provide a first audio/video live stream for the server 12.

The second end 11 is configured to provide a second audio/video live stream for the server 12.

The server 12 is configured to: perform coding and processing on the first audio/video live stream and the second audio/video live stream, to obtain a third video live stream, and push the third video stream to the third end 13.

The third end 13 is configured to play audio/video content of the first end 10 and the first end 11 according to the third video live stream.

In an embodiment, the server 12 is further configured to push the third video stream to the first end 10 and the first end 11 after obtaining the third video live stream.

The first end 10 is further configured to play the audio/video content of the first end 10 and the first end 11 according to the third video live stream.

The first end 11 is further configured to play the audio/video content of the first end 10 and the first end 11 according to the third video live stream.

Figure 12:
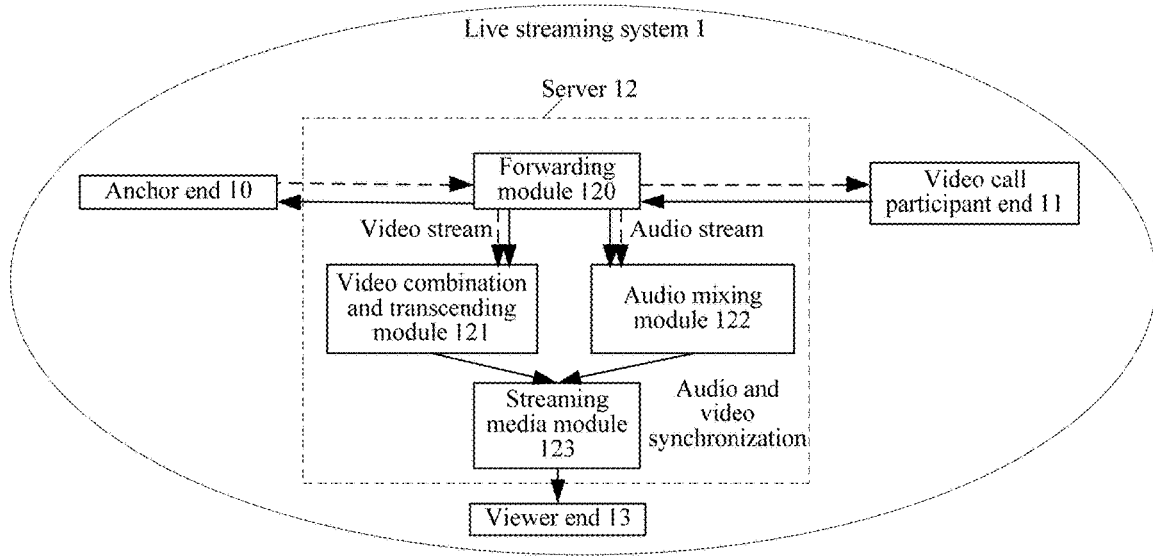
FIG. 12 is a second block diagram of a live streaming system according to an embodiment of the present disclosure.

In an embodiment, based on FIG. 11, as shown in FIG. 12, the server 12 includes: a forwarding module 120, a video combination and transcending module 121, an audio mixing module 122, and a streaming media module 123.

The server 12 is configured to: collect, by using the forwarding module, the first audio/video live stream from the first end 10 and the second audio/video live stream from the first end 11, the first audio/video live stream including a first audio live stream and a first video live stream, and the second audio/video live stream including a second audio live stream and a second video live stream; perform, by using the video combination and transcending module 121, superposition coding on the first video live stream and the second video live stream to output a third video live stream; perform, by using the audio mixing module 122, audio mixing on the first audio live stream and the second audio live stream to obtain a third audio live stream; and synchronize and package, by using the streaming media module 123, the third audio live stream and the third video live stream, to obtain a third audio/video live stream, and push the third audio/video live stream to the third end 13.

Figure 13:
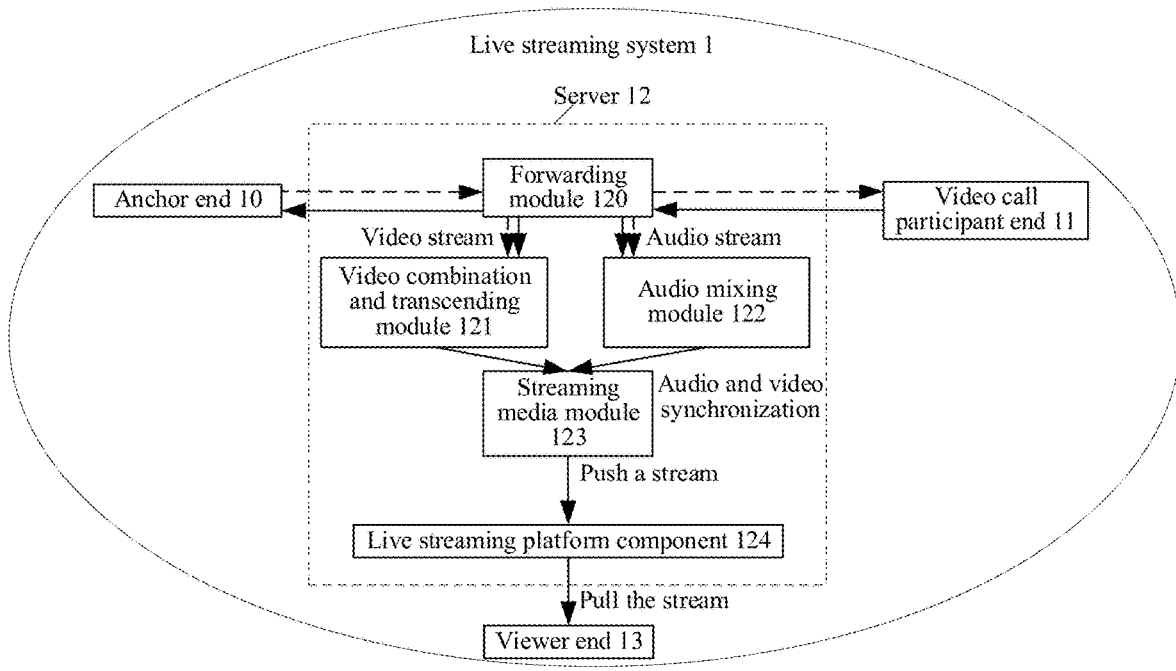
FIG. 13 is a third block diagram of a live streaming system according to an embodiment of the present disclosure.

In an embodiment, based on FIG. 12, as shown in FIG. 13, the server 12 further includes a live streaming platform component 124.

The server 12 is further configured to: synchronize, by using the streaming media module 123, the third audio live stream and the third video live stream according to a time stamp, to obtain a fourth audio/video live stream, package the fourth audio/video live stream, to obtain the third audio/video live stream, and push the third audio/video live stream to the third end 13 by using the live streaming platform component 124.

In an embodiment, the server 12 is further configured to: push the third audio/video live stream to the live streaming platform component 124 by using the streaming media module 123; and send the third audio/video live stream to the third end 13 by using the live streaming platform component 124.

Figure 14:
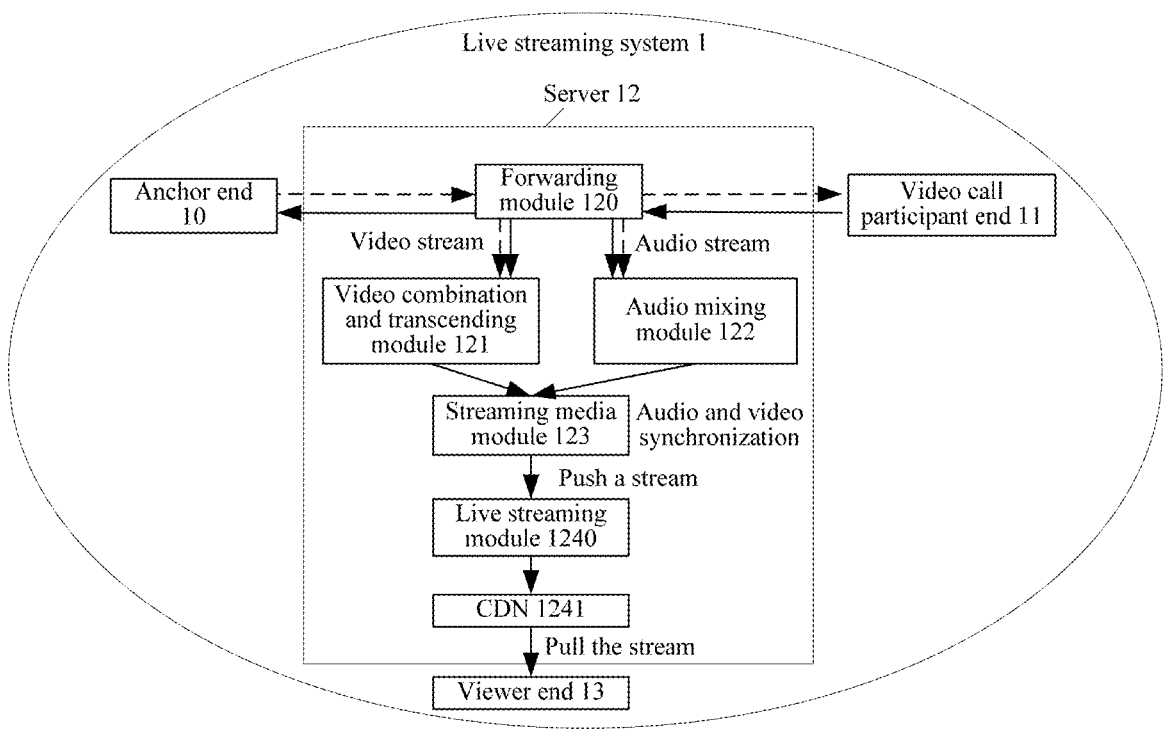
FIG. 14 is a fourth block diagram of a live streaming system according to an embodiment of the present disclosure.

In an embodiment, based on FIG. 13, as shown in FIG. 14, the live streaming platform component 124 includes: a live streaming module 1240 and a CDN module 1241.

The third end 13 is further configured to: obtain a first address for viewing a live stream; and send a live stream viewing request to the CDN module 1241 according to the first address.

The server 12 is further configured to: pull, by using the live streaming module 1240, the third audio/video live stream according to the live stream viewing request, and send, by using the CDN module 1241, the third audio/video live stream to the third end 13 if the third audio/video live stream is obtained through pulling.

The third end 13 is configured to play the audio/video content of the first end 10 and the first end 11 according to the third audio/video live stream.

In an embodiment, the server 12 is further configured to: after pulling, by using the live streaming module 1240, the third audio/video live stream according to the live stream viewing request, send, by using the CDN module 1241 to the third end 13 if the third audio/video live stream is not obtained through pulling, prompt information indicating that information obtaining fails.

The third end 13 is further configured to end, by using the CDN module 1241, a current live content viewing session according to the prompt information indicating that information obtaining fails.

It should be noted that the modules in the server 12 in this embodiment of the present disclosure may be computer programs disposed in a same server or may be disposed in different servers. If the modules are disposed in different servers, the server 12 in this embodiment of the present disclosure refers to a server cluster. The number of servers is not limited in this embodiment of the present disclosure, and may be determined by an actual application.

In an embodiment, the first end 10 for information interaction, the second end 11 for information interaction, and the third end 13 for information interaction in this embodiment of the present disclosure each may be any one of the terminals 51 to 55 in FIG. 1. This is not limited in this embodiment of the present disclosure.

It can be understood that because after collecting audio/video data of the first end for information interaction and audio/video data of the second end for information interaction, the server directly processes the collected audio/video data and then directly transmits final audio/video data to the third end for information interaction, transmission of massive data between the first end for information interaction, the second end for information interaction, and the third end for information interaction after the server collects the foregoing audio/video data is avoided. Therefore, bandwidth consumption during information interaction is reduced, repeated exchanges of massive data are effectively reduced, and a presentation effect of live streaming is further improved.

A person skilled in the art should understand that the embodiments of the present disclosure may be provided as a method, a system, a server, or a computer program product. Therefore, the present disclosure may use a form of hardware embodiments, software embodiments, or embodiments with a combination of software and hardware. Moreover, the present disclosure may use a form of a computer program product that is implemented on one or more computer-usable storage media (including but not limited to a magnetic disk storage, an optical storage, and the like) that include computer-usable program code.

Based on such an understanding, the technical solutions of the embodiments of the present disclosure essentially, or the part contributing to the existing technology may be represented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any medium that can store program code, such as a USB flash drive, a removable hard disk, a read-only memory (ROM), a magnetic disk, or an optical disc.

Correspondingly, an embodiment of the present disclosure further provides a computer storage medium, the computer storage medium storing a computer program, and the computer program, when run by a processor, performing the following steps: collecting a first audio/video live stream from a first end for information interaction and a second audio/video live stream from a second end for information interaction, the first audio/video live stream including a first audio live stream and a first video live stream, and the second audio/video live stream including a second audio live stream and a second video live stream; performing superposition coding on the first video live stream and the second video live stream to output a third video live stream; performing audio mixing on the first audio live stream and the second audio live stream to obtain a third audio live stream; and synchronizing and packaging the third audio live stream and the third video live stream, to obtain a third audio/video live stream, and pushing the third audio/video live stream to a third end for information interaction.

The computer program, when run by the processor, further performs the following steps: synchronizing the third audio live stream and the third video live stream according to a time stamp, to obtain the fourth audio/video live stream; packaging the fourth audio/video live stream, to obtain the third audio/video live stream; and pushing the third audio/video live stream to the third end by using a live streaming platform component.

The computer program, when run by the processor, further performs: pushing the third audio/video live stream to the first end and the second end.

The computer program, when run by the processor, further performs the following steps: receiving a live stream viewing request sent by the third end; pulling the third audio/video live stream according to the live stream viewing request; and sending the third audio/video live stream to the third end if the third audio/video live stream is obtained through pulling.

The computer program, when run by the processor, further performs the following step: sending, to the third end if the third audio/video live stream is not obtained through pulling, prompt information indicating that information obtaining fails.

An embodiment of the present disclosure further provides a server. A composition structure of the server includes: a processor, and a memory, configured to store a computer program capable of running on the processor. The processor is configured to perform the following steps when running the computer program: collecting a first audio/video live stream from a first end for information interaction and a second audio/video live stream from a second end for information interaction, the first audio/video live stream including a first audio live stream and a first video live stream, and the second audio/video live stream including a second audio live stream and a second video live stream. The processor is configured to further perform the steps of: performing superposition coding on the first video live stream and the second video live stream to output a third video live stream; performing audio mixing on the first audio live stream and the second audio live stream to obtain a third audio live stream; and synchronizing and packaging the third audio live stream and the third video live stream, to obtain a third audio/video live stream, and pushing the third audio/video live stream to a third end for information interaction.

The processor is further configured to perform the following steps when running the computer program: synchronizing the third audio live stream and the third video live stream according to a time stamp, to obtain the fourth audio/video live stream; packaging the fourth audio/video live stream, to obtain the third audio/video live stream; and pushing the third audio/video live stream to the third end by using a live streaming platform component.

The processor is further configured to perform the following step when running the computer program: pushing the third audio/video live stream to the first end and the second end.

The processor is further configured to perform the following steps when running the computer program: receiving a live stream viewing request sent by the third end; pulling the third audio/video live stream according to the live stream viewing request; and sending the third audio/video live stream to the third end if the third audio/video live stream is obtained through pulling.

The processor is further configured to perform the following step when running the computer program: sending, to the third end if the third audio/video live stream is not obtained through pulling, prompt information indicating that information obtaining fails.

Figure 15:
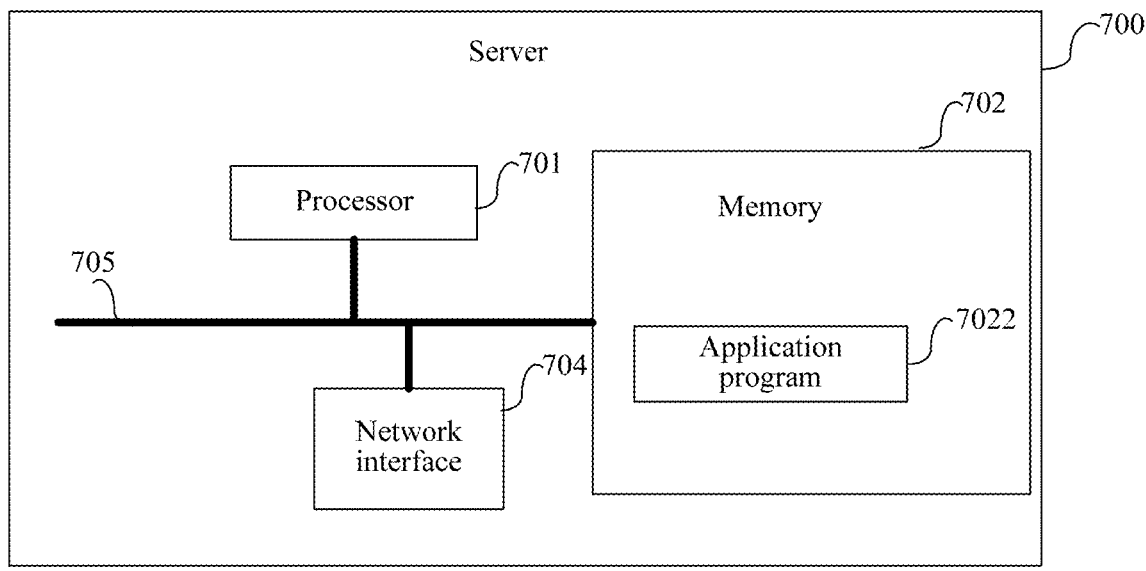
FIG. 15 is a schematic structural diagram of hardware composition of a server according to an embodiment of the present disclosure.

FIG. 15 is a schematic structural diagram of hardware composition of a server according to an embodiment of the present disclosure. The server 700 includes: at least one processor 701, a memory 702, and at least one network interface 704. Components in the server 700 are coupled together by using a bus system 705. It can be understood that the system bus 705 is configured to implement connection and communication between these components. The bus system 705 may further include a power bus, a control bus, and a status signal bus in addition to a data bus. However, for the purpose of clear description, all buses are marked as the bus system 705 in FIG. 15.

It can be understood that the memory 702 may be a volatile memory or a non-volatile memory, or may include both a volatile memory and a non-volatile memory. The non-volatile memory may be a ROM, a programmable ROM (PROM), an erasable PROM (EPROM), an electrically EPROM (EEPROM), a ferromagnetic random access memory (FRAM), a flash memory, a magnetic surface memory, an optical disc, or compact disc-ROM (CD-ROM). The magnetic surface memory may be a magnetic disk memory or a magnetic tape memory. The volatile memory may be a random access memory (RAM), and is used as an external cache. RAMs in many forms such as a static RAM (SRAM), a synchronous SRAM (SSRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DR RAM) are available. Those are examples rather than limitative descriptions. The memory 702 in this embodiment of the present disclosure is intended to include but is not limited to these memories and any other memory of a suitable type.

The memory 702 in this embodiment of the present disclosure is configured to store various types of data to support operation of the server 700. Examples of these types of data include any computer program to be operated on the server 700, for example, an application program 7022. A program for implementing the method in the embodiments of the present disclosure may be included in the application program 7022.

The method disclosed in the foregoing embodiments of the present disclosure may be applied to the processor 701, or may be implemented by the processor 701. The processor 701 may be an integrated circuit chip and has a signal processing capability. In an implementation process, steps in the foregoing methods may be implemented by using an integrated logical circuit of hardware in the processor 701, or an instruction in the form of software. The processor 701 may be a general purpose processor, a digital signal processor (DSP), or another programmable logical device, discrete gate or transistor logical device, a discrete hardware component, or the like. The processor 701 may implement or execute methods, steps, and logical block diagrams disclosed in the embodiments of the present disclosure. The general-purpose processor may be a microprocessor, any conventional processor, or the like. The steps in the methods disclosed in the embodiments of the present disclosure may be directly implemented by a hardware decoding processor, or may be implemented by combining hardware and software modules in a decoding processor. A software module may be software programs located in a storage medium. The storage medium is located in the memory 702. The processor 701 reads information in the memory 702 and performs the steps of the foregoing methods in combination with hardware of the processor 701.

In an exemplary embodiment, the server 700 may be implemented by using one or more application-specific integrated circuit (ASIC), a DSP, a programmable logic device (PLD), a complex PLD (CPLD), a field programmable gate array (FPGA), a general purpose processor, a controller, a micro controller unit (MCU), a microprocessor, or another electronic element, to perform the foregoing method.

The present disclosure is described with reference to flowcharts and/or block diagrams of the method, device (system), and computer program product in the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

The foregoing descriptions are merely preferred embodiments of the present disclosure, and are not intended to limit the protection scope of the present disclosure.

Industrial Practicability

The embodiments of the present disclosure are applicable to a live streaming system. A first end for information interaction provides a first audio/video live stream for a server. A second end for information interaction provides a second audio/video live stream for the server. The server performs coding and processing on the first audio/video live stream and the second audio/video live stream, to obtain a third audio/video live stream, and pushes the third audio/video stream to a third end for information interaction. The third end views audio/video content of the first end and the second end according to the third audio/video live stream. In this way, transmission of massive data between the first end for information interaction, the second end for information interaction, and the third end for information interaction after the server collects the foregoing audio/video data can be avoided. Therefore, bandwidth consumption during information interaction is reduced, repeated exchanges of massive data are effectively reduced, and a presentation effect of live streaming is further improved.

What is claimed is:

1. A live streaming method, applied to a live streaming system, and comprising:
providing, by a first end client, a first audio/video live stream to a server;
providing, by a second end client, a second audio/video live stream to the server;
processing, by the server, the first audio/video live stream and the second audio/video live stream to obtain a third audio/video live stream, and pushing the third audio/video stream to a third end client, wherein processing and pushing comprise:
receiving, by the server, a live stream viewing request from the third end client;
pulling, by the server, the third audio/video live stream according to the live stream viewing request; and
sending, by the server, the third audio/video live stream to the third end client in response to determining that the third audio/video live stream has been pulled by the server;
receiving, by the third end client, audio/video content of the first end client and the second end client according to the third audio/video live stream;
returning, by the server, the third audio/video live stream back to at least one of the first end client or the second end client for the at least one of the first end client or the second end client to view own audio/video content, and displaying, by the at least one of the first end client or the second end client, a head image of a first individual associated with the first audio/video live stream and a head image of a second individual associated with the second audio/video live stream;
pulling, by the server, a fourth audio/video live stream according to the live stream viewing request; and
sending, by the server to the third end client, prompt information indicating that the server is unable to pull the fourth audio/video live stream, and ending, by the third end client, a current live content viewing session according to the prompt information.

2. The method according to claim 1, further comprising:
collecting, by the server, the first audio/video live stream from the first end client for information interaction and the second audio/video live stream from the second end client for information interaction, the first audio/video live stream comprising a first audio live stream and a first video live stream, and the second audio/video live stream comprising a second audio live stream and a second video live stream;
performing, by the server, superposition coding on the first video live stream and the second video live stream to output a third video live stream;
performing, by the server, audio mixing on the first audio live stream and the second audio live stream to obtain a third audio live stream; and
synchronizing and packaging, by the server, the third audio live stream and the third video live stream, to obtain a third audio/video live stream, and pushing the third audio/video live stream to a third end client.

3. The method according to claim 2, further comprising:
synchronizing, by the server, the third audio live stream and the third video live stream according to a time stamp, to obtain a fifth audio/video live stream;
packaging, by the server, the fifth audio/video live stream, to obtain the third audio/video live stream; and
pushing, by the server, the third audio/video live stream to the third end client by using a live streaming platform component.

4. The method according to claim 3, wherein the live streaming platform component comprises: a live streaming module and a content delivery network (CDN) module, and the method further comprises:
obtaining, by the third end client, a first address for receiving a live stream; and sending a live stream viewing request to the CDN module according to the first address;
pulling, by the server, the third audio/video live stream according to the live stream viewing request, and sending the third audio/video live stream to the third end client if the third audio/video live stream is obtained through pulling; and
playing, by the third end client, the audio/video content of the first end client and the second end client according to the third audio/video live stream.

5. The method according to claim 4, further comprising:
after pulling the third audio/video live stream according to the live stream viewing request, send to the third end client, by the server using the CDN module, prompt information indicating that information obtaining fails if the third audio/video live stream is not obtained through pulling; and
ending, by the third end client using the CDN module, a current live content viewing session according to the prompt information indicating that information obtaining fails.

6. The method according to claim 1, wherein receiving by the third end client the audio/video content of the first end client and the second end client according to the third audio/video live stream comprises:

detecting, by the third end client, a click or touch operation on an interface of the third end client; and upon detecting the click or touch operation, displaying on the interface of the third end client, the video/audio content of the first end client and the second end client according to the third audio/video live stream.

7. The method according to claim 1, wherein
the head image of the first individual and the head image of the second individual are also displayed at the third end client.

8. The method according to claim 1, wherein
at the first end client, the head image of the first individual is displayed above and being larger in dimension than the second image of the second individual, and at the second end client, the head image of the second individual is displayed above and being larger in dimension than the head image of the first individual.

9. A live streaming system, comprising: a first end client for information interaction, a second end client for information interaction, a server, and a third end client for information interaction, the first end, the second end, and the third end clients exchanging data by using the server, wherein:

the first end client is configured to provide a first audio/video live stream for the server;

the second end client is configured to provide a second audio/video live stream for the server;

the server is configured to perform processing on the first audio/video live stream and the second audio/video live stream, to obtain a third audio/video live stream, to push the third audio/video stream to the third end client, and to push the third video live stream back to at least one of the first end client or the second end client for the at least one of the first end client or the second end client to view own audio/video content, and the at least one of the first end client or the second end client is further configured to display a head image of a first individual associated with the first audio/video live stream and a head image of a second individual associated with the second audio/video live stream, wherein obtaining and pushing comprise:

receiving a live stream viewing request from the third end client;

pulling the third audio/video live stream according to the live stream viewing request; and sending the third audio/video live stream to the third end client in response to determining that the third audio/video live stream has been pulled by the server;

the third end client is configured to play audio/video content of the first end client and the second end client according to the third audio/video live stream;

pulling a fourth audio/video live stream according to the live stream viewing request; and sending to the third end client prompt information indicating that the server is unable to pull the fourth audio/video live stream such that the third end client ends a current live content viewing session according to the prompt information.

10. The system according to claim 9, wherein:
the first end client is further configured to play the audio/video content of the first end client and the second end client according to the third audio/video live stream; and the second end client is further configured to play the audio/video content of the first end client and the second end client according to the third audio/video live stream.

11. The system according to claim 9, wherein the server is configured to:

collect the first audio/video live stream from the first end client and the second audio/video live stream from the second end client, the first audio/video live stream including a first audio live stream and a first video live stream, and the second audio/video live stream including a second audio live stream and a second video live stream;

perform superposition coding on the first video live stream and the second video live stream to output a third video live stream;

perform audio mixing on the first audio live stream and the second audio live stream to obtain a third audio live stream; and package the third audio live stream and the third video live stream, to obtain the third audio/video live stream, and push the third audio/video live stream to the third end client.

12. The system according to claim 11, wherein the server is further configured to:

synchronize the third audio live stream and the third video live stream according to a time stamp, to obtain a fifth audio/video live stream;

package the fifth audio/video live stream, to obtain the third audio/video live stream; and push the third audio/video live stream to the third end client.

13. A server, comprising: a processor, and a memory, configured to store a computer program capable of running on the processor, and the processor being configured to, when running the computer program, perform:

collecting a first audio/video live stream from a first end client and a second audio/video live stream from a second end client, the first audio/video live stream including a first audio live stream and a first video live stream, and the second audio/video live stream including a second audio live stream and a second video live stream;

performing superposition coding on the first video live stream and the second video live stream to output a third video live stream;

performing audio mixing on the first audio live stream and the second audio live stream to obtain a third audio live stream;

packaging the third audio live stream and the third video live stream to obtain a third audio/video live stream, and pushing the third audio/video live stream to a third end client wherein obtaining and pushing comprise:

receiving a live stream viewing request from the third end client;

pulling the third audio/video live stream according to the live stream viewing request; and sending the third audio/video live stream to the third end client in response to determining that the third audio/video live stream has been pulled by the server; and returning the third audio/video live stream back to at least one of the first end client or the second end client for the at least one of the first end client or the second end client to view own audio/video content, by wherein the third audio/video live stream allows the at least one of the first end client or the second end client to display a head image of a first individual associated with the first audio/video live stream and a head image of a second individual associated with the second audio/video live stream;

pulling a fourth audio/video live stream according to the live stream viewing request; and sending to the third end client prompt information indicating that the server is unable to pull the fourth audio/video live stream such that the third end client ends a current live content viewing session according to the prompt information.

14. The server according to claim 13, wherein the processor is further configured to perform:

synchronizing the third audio live stream and the third video live stream according to a time stamp, to obtain a fifth audio/video live stream;

packaging the fifth audio/video live stream, to obtain the third audio/video live stream; and pushing the third audio/video live stream to the third end client.

* * * * *